UNITED STATES PATENT OFFICE.

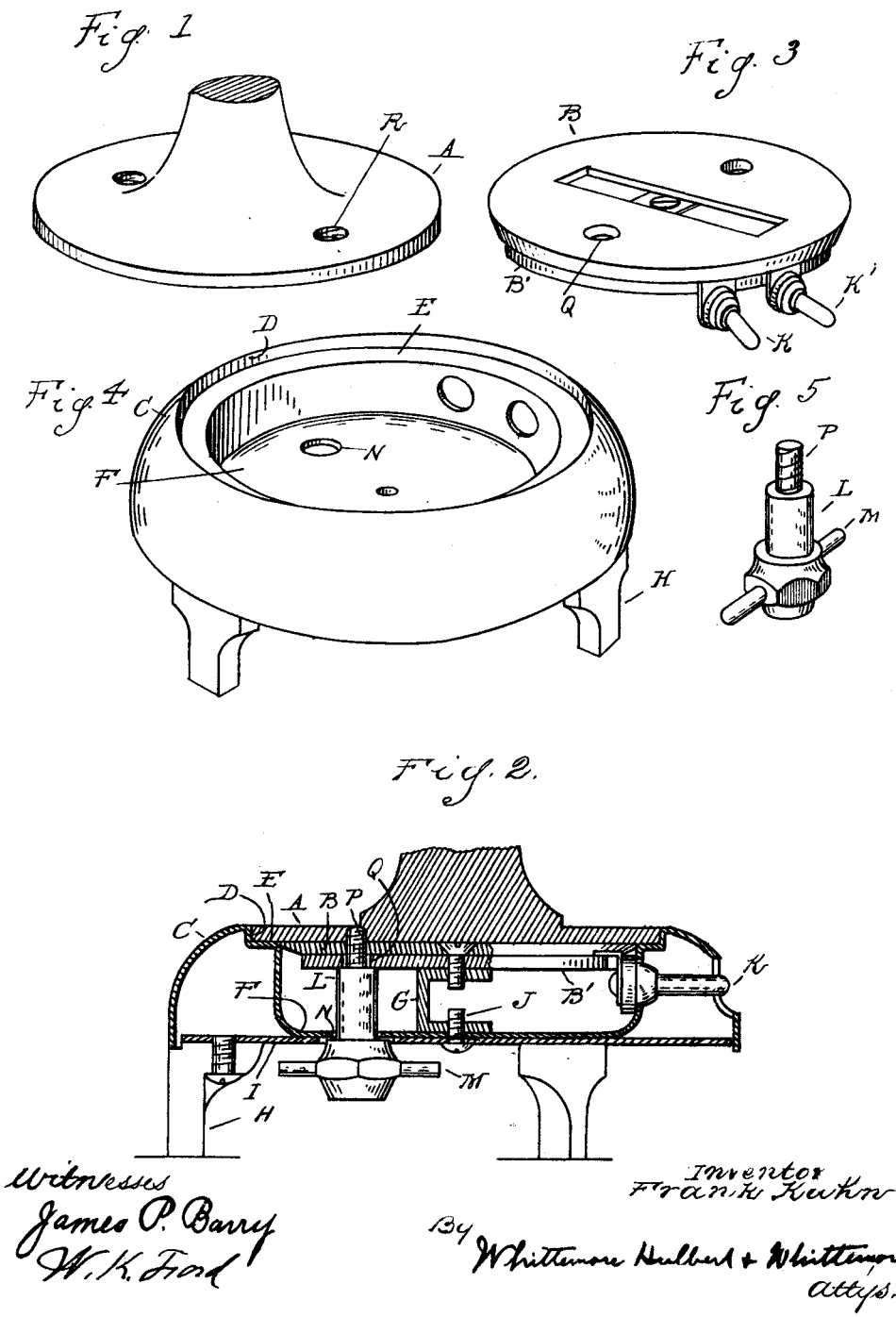
F. KUHN.
ELECTRIC HEATER.
APPLICATION FILED OCT. 5, 1912.
1,087,594.
Patented Feb. 17, 1914.

FRANK KUHN, OF DETROIT, MICHIGAN.

ELECTRIC HEATER.

1,087,594.  Specification of Letters Patent.  Patented Feb. 17, 1914.

Application filed October 5, 1912. Serial No. 724,172.

*To all whom it may concern:*

Be it known that I, FRANK KUHN, a citizen of the United States of America, residing at Detroit, in the county of Wayne and State of Michigan, have invented certain new and useful Improvements in Electric Heaters, of which the following is a specification, reference being had therein to the accompanying drawings.

The invention relates to electric heaters designed for use in connection with various cooking utensils—such as coffee pots, etc., and it is the primary object of the invention to obtain a construction of heater base which may be exchangeably engaged with different utensils and which permits of readily detaching the heating-element from both the base and the utensil to facilitate the cleaning of said parts.

To this end the invention consists in the construction as hereinafter set forth.

In the drawings: Figure 1 is a perspective view of the base detached; Fig. 2 is a vertical central section through the instrument in operative condition; Fig. 3 is a perspective view of the heating unit detached; Fig. 4 is a perspective view of the stand detached; and Fig. 5 is a perspective view of the attaching screw.

To convey the heat from an electric heating-element to the body to be heated, it is desirable to have a relatively large contacting surface, but with many cooking utensils—as for instance coffee and tea percolators—it is necessary to concentrate the heat in a comparatively small body. To accomplish this result the utensil is provided with a base portion which enlarges into a flat plate which is the full area of the heating unit, so that when said unit is clamped to said plate the heat transferred to the latter will be conveyed by conduction to the point of application.

With my improved construction, various utensils to be heated are provided with heat receiving base-plates A, which are of slightly greater diameter than the heating unit B of disk form.

C is a stand comprising an annular member, preferably struck up from sheet metal and having at its top a recess D of a diameter to receive and fit the plate A.

E is a ledge extending inward at the bottom of the recess D and forming a support for the plate A, while the space within this ledge is of a diameter to receive the heating unit B.

The member C is preferably formed integral with a cup portion F, which forms a heat-insulating air chamber beneath the base A, the latter being supported within this cup by a central bracket G. The stand C is provided with a plurality of legs H, preferably attached to a base plate I, which in turn is secured to the cup portion F by the same screw J which attaches the bracket G. The portions F and C are provided with alined apertures for the passage outward of terminals K and K' mounted upon the element B and projecting outwardly therefrom.

L are securing shoulder screws, preferably provided with T-shaped heads M, which facilitate their engagement and disengagement. These screws are inserted through apertures N in the bottom of the cup portion F, and the threaded end portions P pass through apertures Q in the heating-element B and engage threaded apertures R in the member A. Thus to attach the utensil to the stand and at the same time to clamp the element in firm heat-conducting contact with the plate A, it is merely necessary to engage and tighten the screws L.

With the construction as described, various utensils may be used with the same heater, and quickly engaged and disengaged therefrom. When in engagement the stand C merges into the base plate A so as to produce a pleasing appearance, and by reason of the fact that the only contact betweer the stand and base A is at the margin of the latter, very little heat is lost. At any time when necessary, the heating element B may be completely detached so as to permit the washing of the other parts. This element B is preferably armored and is provided on its under side with a heat-distributing plate B'; but the specific construction of the element forms no part of the present invention.

What I claim as my invention is:

1. In an electric heater the combination with a utensil having a flat, disk base of an annular stand, fashioned to afford marginal support for said flat disk, an electrical heating element within said stand in contact with said disk, and means operable from beneath the stand in the assembled position of the parts for clamping said element and stand to said disk.

2. In an electric heater the combination of an annular stand having a recessed top with an inwardly-extending ledge in said recess, a removable utensil having a flat, disk base fiitting in said recess and supported upon said ledge, a flat heating-element fitting within said ledge, in contact with said disk, and clamping screws operable from beneath said stand in the assembled position of the parts for clamping said element to said disk and for securing the latter to said stand.

3. An electric heater comprising a stand, having an annular portion and a central depressed or cup portion, provided with a ledge near the top thereof, a utensil having a flat disk fitting within said cup portion and supported upon said ledge, a heating-element fitting within said ledge and in contact with said disk, terminals on said element passing outward through said cup and annular portion, and clamping means engageable through the bottom of said cup for clamping said heating-element to said disk.

4. An electric heater comprising a stand, having an annular portion and a central depressed or cup portion, struck up from a sheet metal blank, said cup portion having an inwardly-extending ledge near the top thereof, a utensil having a disk-shaped base fitting within said cup portion and supported upon said ledge, a heating-element fitting within said ledge, in contact with said disk, terminal contacts passing through registering apertures in said cup and annular portion, a central bracket for supporting said heating-element within said cup, and a shouldered clamping screw engaging an aperture in said cup and securing said heating-element to said base.

5. An electric heater comprising a sheet metal stand, having an annular portion and a central depressed cup portion, provided with an inwardly-extending ledge near its top, a utensil having a flat, disk base fitting within said cup portion and supported on said ledge, a heating-element fitting within said ledge in contact with said disk, terminal contacts on said heating-element, extending outward through registering apertures in said cup and annular portion, a central bracket for supporting said heater from the bottom of said cup, a plurality of legs for said stand, a bottom plate to which said legs are attached, a screw for securing said bottom plate, engaging said central bracket, and a clamping shouldered screw engaging registering apertures in said bottom plate and cup, and clamping said heater to said disk.

In testimony whereof I affix my signature in presence of two witnesses.

FRANK KUHN.

Witnesses:
 JAMES P. BARRY,
 DELBERT COLLINS.